Jan. 16, 1962 W. G. APPLEFIELD 3,017,629
SWEEP CIRCUIT
Filed April 16, 1958 6 Sheets-Sheet 1

INVENTOR:
William G. Applefield
Attorney

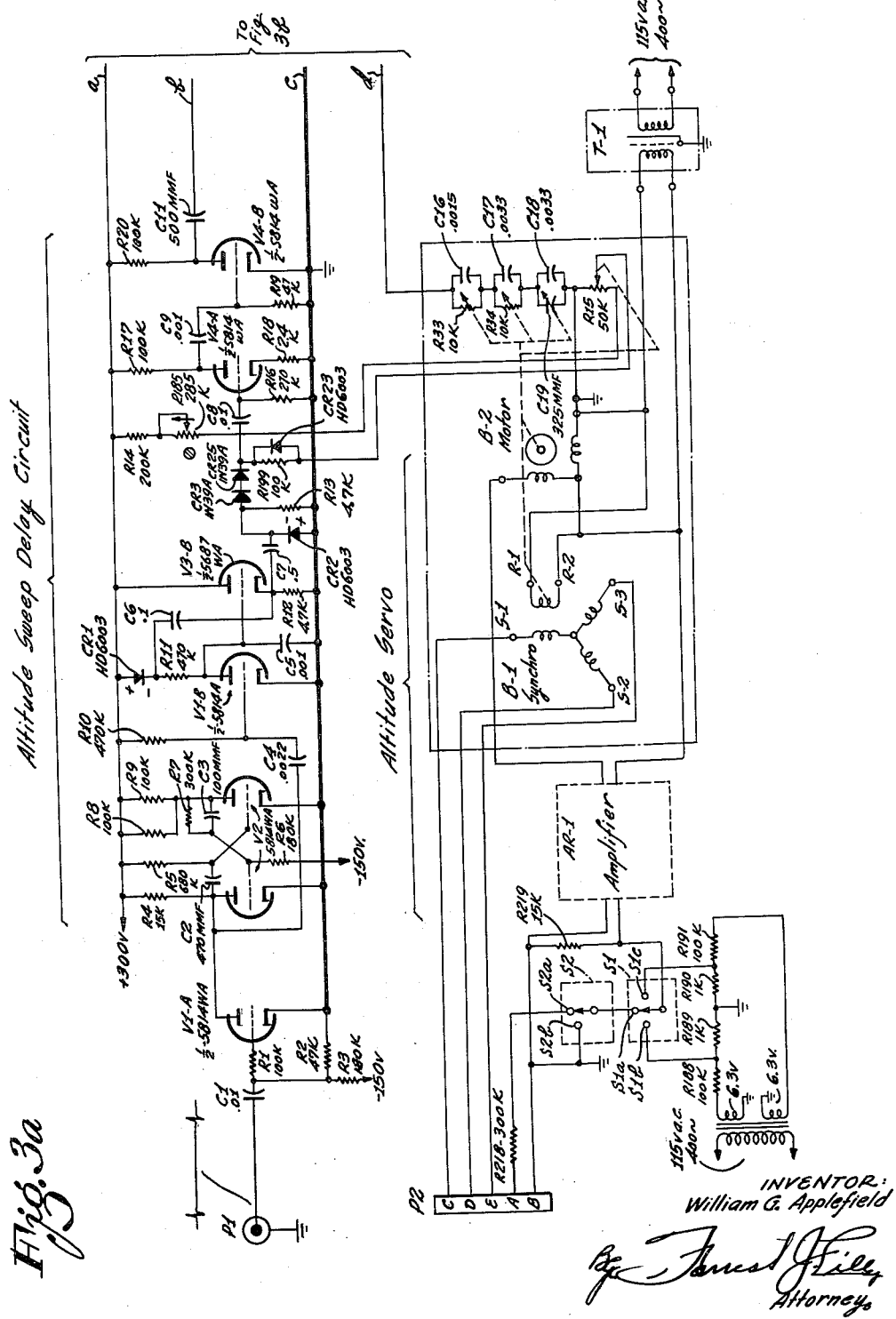

Jan. 16, 1962 W. G. APPLEFIELD 3,017,629
SWEEP CIRCUIT
Filed April 16, 1958 6 Sheets-Sheet 3
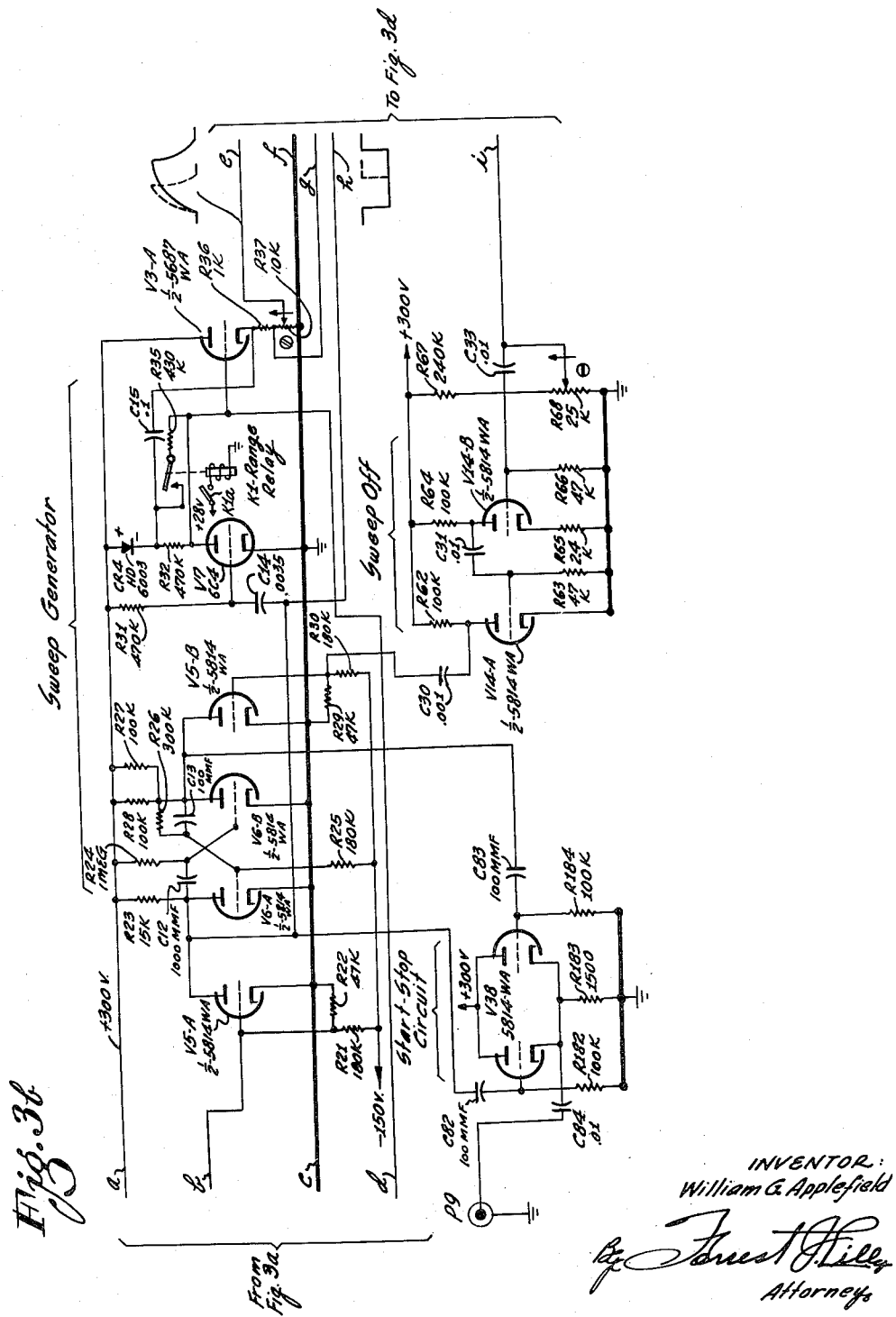
INVENTOR:
William G. Applefield
By Forest J. Lilly
Attorneys Jan. 16, 1962 W. G. APPLEFIELD 3,017,629
SWEEP CIRCUIT
Filed April 16, 1958 6 Sheets-Sheet 4

INVENTOR:
William G. Applefield
By [signature]
Attorneys

Jan. 16, 1962     W. G. APPLEFIELD     3,017,629

SWEEP CIRCUIT

Filed April 16, 1958     6 Sheets-Sheet 5

INVENTOR:
William G. Applefield
Attorney

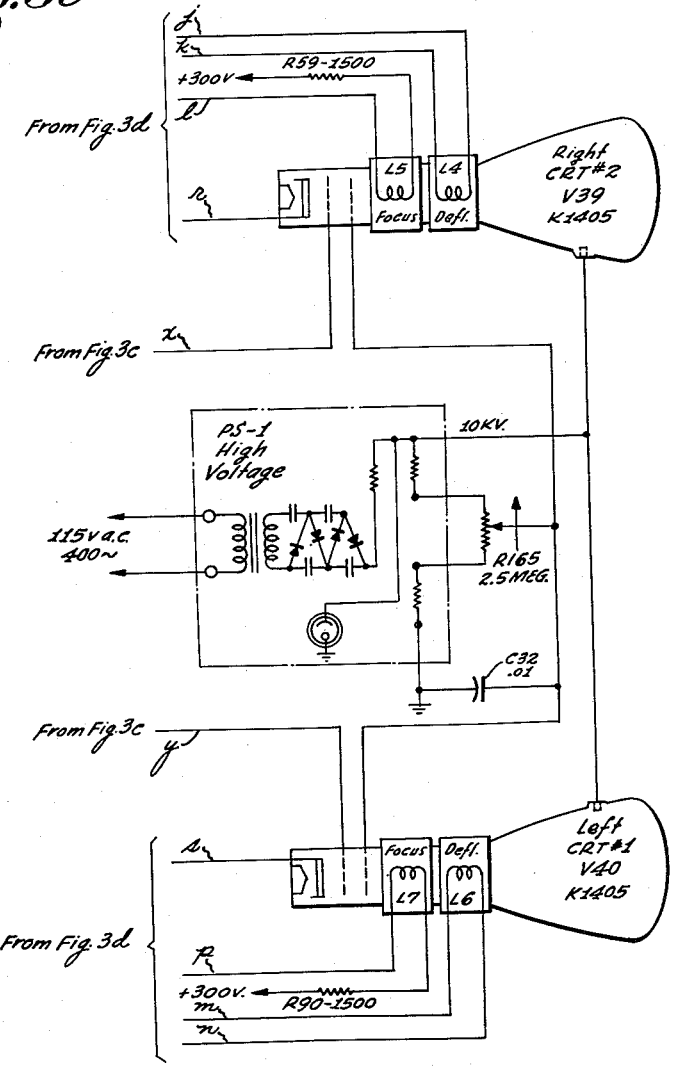
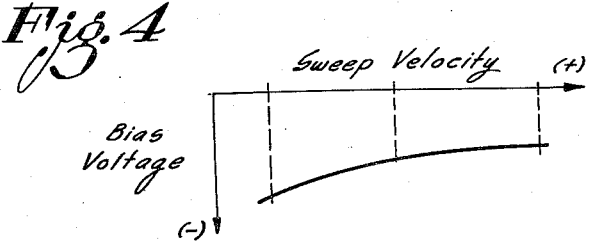

3,017,629
SWEEP CIRCUIT

William G. Applefield, Pasadena, Calif., assignor to Hycon Mfg. Company, Pasadena, Calif., a corporation of Delaware
Filed Apr. 16, 1958, Ser. No. 729,032
6 Claims. (Cl. 343—5)

My invention relates generally to sweep circuits and more particularly to a circuit for producing an intensity modulated line trace on the face of a cathode ray tube from radar derived video signals, representing a faithful reproduction of a narrow strip of terrain as viewed by a radar side-looking antenna.

An airborne radar strip recorder generally employs an echo type radar set having a side-looking antenna which views a narrow strip of terrain below that is oriented at right angles to the flight path (heading direction). This narrow, lateral strip as viewed by the radar antenna is swept along with forward motion of the aircraft, scanning the terrain below in the direction of flight. The narrow strips are scan lines which are to be accurately reproduced each as an intensity modulated line trace on the face of a cathode ray tube, presenting a radar line image of each narrow strip. The traces can be continuously photographed and recorded by a suitable strip camera in which light sensitive film is moved at a proper speed to produce a radar ground map of terrain flown over.

The video signals provided by the echo type radar set are returned signals of a periodically transmitted radar pulse and electrically describe each scan line or narrow strip viewed by the radar antenna, and can be used to intensity modulate the electron beam of the cathode ray tube. The echo return signals for uniformly equal increasing lateral ground distance increments from a point directly below the aircraft do not, however, return uniformly or linearly as a function of time, since the slant distance or true range increases hyperbolically with increasing equal increment lateral ground distance as will be shown later. This lack of lineal correspondence is further complicated when aircraft altitude is subject to fluctuation and change. The electron beam must accordingly be deflected by an altitude responsive hyperbolic sweep signal, in order to obtain correspondence of reproduced trace image and the viewed terrain strip. Cathode ray tube response characteristics also affect the trueness of the reproduced trace image.

It is an object of my invention to provide a new and useful hyperbolic sweep generator having an output which is additionally variable with altitude, for producing a suitable cathode ray tube deflection signal in an airborne radar strip recorder of the class described.

Another object of this invention is to provide a sweep circuit wherein an accurate line trace is reproduced on the face of a cathode ray tube which is compensated fully for tube response characteristics.

A further object of my invention is to provide a sweep circuit for an intensity modulated airborne radar strip recorder in which correct intensity compensation is easily obtained for different lateral scan ranges.

Briefly, the foregoing and other objects are preferably accomplished by providing a sweep circuit in an airborne radar strip recorder wherein a novel sweep generator produces an altitude controlled hyperbolic sweep output signal in response to radar trigger signals, the hyperbolic sweep signal being applied to the deflection coil of an intensity modulated cathode ray tube. An intensity compensation signal is derived from the hyperbolic sweep signal and is mixed with radar reconnaissance information video signals to compensate for the effect of a varying speed beam sweep on the light output intensity of the cathode ray tube, to produce a faithful image reproduction of the reconnaissance information. Correct compensation is also provided for the effect of cathode ray tube bias voltage on light output intensity of the trace over different ranges of electron beam sweep velocities. Duplexing means including a switching gate and unblanking circuits are provided whereby two cathode ray tubes can be alternately energized by fully compensated video signals which supply reconnaissance information from two antennas having respective fields of view.

My invention possesses other objects and features, some of which together with the foregoing, will be set forth in the following detailed description of a preferred embodiment of my invention, and the invention will be more fully understood by reading the description with joint reference to the attached drawings, in which.

FIGURES 3a, 3b, 3c, 3d and 3e, together, comprise a detailed wiring diagram of a preferred embodiment of my sweep circuit; and FIGURE 4 is a graph showing a constant cathode ray tube light output intensity curve which relates increasing sweep speed with increasing negative control grid bias voltage.

Figure 1:
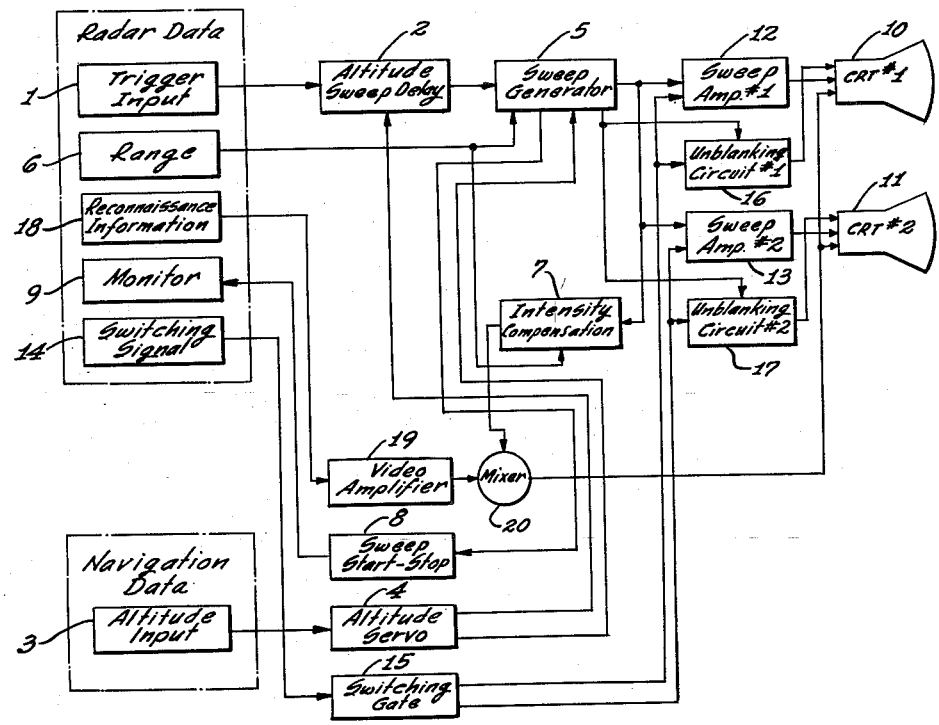
FIGURE 1 is functional block diagram of my invention as incorporated in an airborne radar strip recorder.

A functional block diagram of a system incorporating my invention is shown in FIGURE 1. Synchronizing and video signals are supplied from a standard ground mapping radar set (AN/APQ-56, -53, etc.) which is carried on board an aircraft. The terrain over which the aircraft flies is scanned by the side-looking radar set on both sides of the flight path in a strip covering a 15 or 30 mile lateral range, as desired, on each side by respective radar antennas. The antennas are alternately switched to connect with the radar set and video signals are alternately derived from each antenna for a time duplexed radar output. The system shown in FIGURE 1 takes the synchronizing and video signals from the radar set and presents the video signals on two cathode ray tubes in the form of two intensity modulated line scans which can be recorded by a suitable strip camera as a continuous plan map of the terrain scanned. The line scans are corrected for true lateral ground distance in this system.

Figure 2:
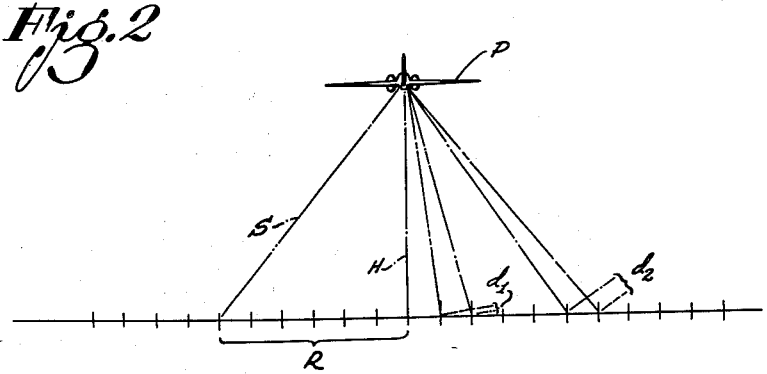
FIGURE 2 is a diagrammatic drawing illustrating the hyperbolic nature of lateral radar strip scanning.

FIGURE 2 diagrammatically illustrates the necessity of a hyperbolic sawtooth sweep to provide a true cathode ray tube representation corresponding correctly to the lateral ground distance being scanned by the radar antennas. An aircraft P is shown flying directly away from the viewer (into the paper) at an altitude H over terrain being scanned by a side-looking radar set carried by the aircraft. Two antennas are normally mounted one on each side of the aircraft and each views a narrow strip extending over a lateral ground range which is measured from a ground point directly below the aircraft. If the aircraft is flying at an altitude which renders vertical rises or differences in ground elevation comparatively negligible, or assuming a generally flat terrain, as the lateral ground distance from a point directly below the aircraft is increased, the slant distance from the aircraft also increases. The difference between successive slant distances from aircraft to ground point for each unit increase of one mile, for example, in lateral ground distance increases progressively as indicated by the differences $d_1$ and $d_2$. The farther out laterally, the greater will be the difference between two successive slant distances. Conversely, the lateral ground distance increments may be initially greater and progressively decrease with increasing range so that the differences between successive slant distances, which can be considered as the minimum radar difference resolution capability, would remain a constant.

Letting S represent the slant distance from aircraft to a lateral ground point and R represent the lateral distance from a point directly below the aircraft to the lateral ground point, then $S^2 = R^2 + H^2$. Solving for R, $R = (S^2 - H^2)^{1/2}$, which is an equation for a hyperbola. The quantity S can be obtained by measuring the echo time of the emitted radar pulse reflected from the different ground points over the selected lateral range being scanned. The altitude H can be similarly determined and is generally a constant for each scan line. Thus, R will be equal to $k(t_s^2 - t_h^2)^{1/2}$ where $k$ is a constant, $t_s$ is the echo time of a reflected radar pulse from ground points along the lateral scan range, and $t_h$ is the echo time of the reflected radar pulse from a ground point directly below the aircraft.

In order to produce a horizontal line trace on the face of a cathode ray tube that will be directly equivalent to the radar viewed lateral scan range in an electromagnetically controlled cathode ray tube, the magnitude of the horizontal deflection coil current must be directly proportional to R, or have a hyperbolic deflection waveform given by the quantity $k(t_s^2 - t_h^2)^{1/2}$. Under this condition, the reproduced cathode ray trace faithfully corresponds point for point to the lateral range R terrain as viewed by the radar set because the electron beam will be deflected to a correct, proportionate point on the face of the cathode ray tube for any instantaneous echo signal being received from a lateral ground point. The echo, or video, signal received at any instant of time, intensity modulates the light spot produced by the electron beam on the face of the cathode ray tube, and the light spot will be at a correct point on the face of the cathode ray tube since the electron beam is deflected at a rate which corresponds exactly with the return rate of the echo signals from the different lateral ground points in the scan range. The hyperbolic timewise variation of the video modulation signal is thus matched by a hyperbolic sweep rate.

A trigger signal input 1 as shown in FIGURE 1 provides periodic timer pulses which indicate the time of transmission of each periodic radar signal. A number of such radar signals are transmitted during each antenna switching (connected) period. Each timer pulse is applied to an altitude sweep delay circuit 2 which produces a delayed output signal for each timer pulse. The output signal is delayed for a time duration proportional to the altitude of the aircraft as determined from navigational data and established by an aneroid altimeter (type MC-2 for example), providing an altitude input 3 to govern the altitude sweep delay circuit 2 through an altitude servo 4.

The altitude servo 4 also regulates a sweep generator 5 that is triggered by each output signal of the altitude sweep delay circuit 2. The sweep generator 5 produces a hyperbolic sweep output signal which is variable in slope and duration according to altitude of the aircraft, to produce a correct line scan corresponding to true lateral ground distance as viewed by the radar antennas. The output of the sweep generator 5 is also affected by the range 6 that the side-looking radar set operates at. The rise time rate (volts per second) of the hyperbolic sweep signal necessary to reach a predetermined output level for a 15 mile range is approximately twice that necessary for a 30 mile range. The selection of a shorter range also modifies the intensity compensation signal which can be derived from the hyperbolic sweep output signal of the sweep generator 5 by intensity compensation means 7. Starting and stopping of the sweep generator 5 causes a sweep start-stop circuit 8 to produce signals which are monitored on an oscilloscope monitor 9, and used to adjust and obtain correct system operation and synchronization.

The hyperbolic sweep output signal of the sweep generator 5 is applied to two cathode ray tubes 10 and 11 through respective sweep amplifiers 12 and 13. The two sweep amplifiers 12 and 13 are controlled by a switching signal 14 provided from the radar set through a switching gate 15 which actually produces two phase opposing gating signals so that the cathode ray tubes 10 and 11 are alternately energized at the radar antenna switching rate. The sweep generator 5 also produces a periodic unblanking signal which is applied to the two cathode ray tubes through respective unblanking circuits 16 and 17 that are also controlled by the switching gate 15 in an overall manner at the same switching rate. Thus, antenna scan of the radar set to the left and right are alternately sampled and displayed on the left (CRT #1) and right (CRT #2) cathode ray tubes 10 and 11, respectively.

Reconnaissance information 18 is provided in the form of video signals by the side-looking radar set and supplied to a video amplifier 19. The output of the video amplifier 19 is added by a mixer 20 to the intensity compensation signal derived from the hyperbolic sweep output signal of the sweep generator 5 and applied to the two cathode ray tubes 10 and 11. The intensity compensation signal compensates for instantaneous sweep speed of the intensity modulated electron beam spot which is horizontally deflected across the face of each cathode ray tube in a hyperbolic sweep to produce the line scan. The light output intensity of a spot on the face of a cathode ray tube, produced by its electron beam, is affected greatly by the duration of exposure, and hence the instantaneous sweep speed, of the intensity modulated electron beam on the spot. For the hyperbolic sweep signal, the slope of the initial rising portion of the hyperbola is much greater than the subsequent section where it begins to level off. The intensity compensation signal increases the intensity of the modulated beam over the initial rise portion to compensate for increased beam sweep speed.

The mixing or adding of the video signal on the intensity compensation signal additionally raises the overall level of the video signal in a manner to ensure that complete reconnaissance information will be reproduced as visible cathode ray tube light output in a substantially linear manner. The variation of sweep speed for a 15 mile range presents a higher overall band of sweep speeds than that for a 30 mile range since a 15 mile range hyperbolic sweep signal is actually a magnified portion of the initial section of a 30 mile hyperbolic sweep signal. This results in a less intense cathode ray tube light output over the shorter range which must be compensated across the entire sweep. Compensation is obtained with reference to the cathode ray tube characteristics and is a function of amplifier (mixer) gain and average signal value corresponding to biasing of the cathode ray tube. This is also accomplished by the intensity compensation means 7.

FIGURES 3a, 3b, 3c, 3d and 3e, together, illustrate a preferred embodiment of my invention. These figures can be connected together by matching correspondingly labeled leads between the various figures. The circuitry and structure of the individual components as shown in these figures are generally conventional in themselves, and need not be described in detail. While specific component types and element values are given in these drawings, they have been noted as examples only which will provide satisfactory operating embodiments, and are not intended to restrict the breadth and scope of my invention. Resistances are given in ohms and capacitances in microfarads, unless otherwise noted.

Timer pulses are supplied to receptacle P1 of the altitude sweep delay circuit in FIGURE 3a at 1200 c.p.s., for example, and indicate the instant of transmission of each radar pulse from a ground mapping type radar set, as before stated. These input trigger pulses are applied through capacitor C1 and limiting resistor R1 to amplifier triode V1-A and the amplified and inverted pulses are used to trigger the one shot multivibrator V2. A negative resultant output pulse is derived from the plate of the left triode section of V2 for each input pulse and is applied to the control grid of a triode V1-B connected as a sawtooth generator. The sawtooth output of the sawtooth generator is fed to the control grid of cathode follower V3-B. Feedback capacitor C6 produces a linear sawtooth output and blocking diode CR1 shortens the charge time for capacitor C6 and increases feedback gain. The output of the cathode follower V3-B is applied to a diode comparator comprising series connected diodes CR3 and CR25 through a positive clamping circuit including diode CR2. An altitude variable reference voltage obtained from potentiometer R15 is applied to the cathode side of the diode CR25 through diode CR23 shunting resistor R199 as shown. Thus, when the sawtooth output from the cathode follower V3-B rises above the level determined by the setting of the tap on potentiometer R15 as applied to the cathode of diode CR25, an output signal from the diode comparator will appear on the input of the two stage amplifier including triodes V4-A and V4-B. An amplified output then appears on lead $b$ through coupling capacitor C11 from the altitude sweep delay circuit.

The altitude as determined by a type MC-2 aneroid altimeter, for example, is translated into suitable mechanical movement by a synchro system which adjusts the setting of the tap of the potentiometer R15 according to altitude. Altitude input data is provided through receptacle P2. The Y connected stator of synchro receiver B-1 is connected to terminals C, D and E and these terminals are connected correspondingly to the Y connected stator of the synchro transmitter. The synchro transmitter rotor winding can be connected to terminals A and B of receptacle P2. Terminal A is connected to switch terminal S2$a$ of a single pole, double throw switch S2 through resistor R218. The other terminal S2$b$ is connected to ground as is the input lead to amplifier AR-1 from terminal B of receptacle P2. The pole of switch S2 is connected to terminal S1$a$ of a single pole, three position switch S1, and the pole of switch S1 is connected to amplifier AR-1 as the other input lead. A resistor R219 is connected between the two input leads of amplifier AR-1.

Terminal S1$b$ of switch S1 is connected to an alternating voltage source through divider resistors R188 and R189, and terminal S1$c$ is connected to another alternating voltage source of opposite phase through divider resistors R190 and R191. The switch S2 is a manual or automatic mode selector switch. The pole is shown in the automatic position in which the synchro will automatically lock in with the altitude transmitter output. When the pole is moved to terminal S2$b$ and ground, the synchro can be stopped or isolated from the transmitter output. The pole of switch S2 can then be moved to either terminals S1$b$ or S1$c$ to manually actuate the synchro B-1 by applying a voltage of proper phase to the input of amplifier AR-1. The amplifier AR-1 block represents a conventional servo amplifier and includes suitable supply voltage connections which are not here shown. The output of the amplifier AR-1 is connected across a winding B-2$a$ of the motor B-2. The other winding B-2$b$ is connected in parallel with the rotor winding of synchro receiver B-1 to the secondary of supply transformer T-1.

The motor B-2 is energized to drive the receiver rotor into corresponding orientation with the position of the transmitter rotor which, of course, reduces the transmitter output signal to zero and de-energizes motor B-2. The motor B-2 is mechanically coupled to actuate the tap of potentiometer R15 and sets a voltage level which is applied to the cathode of diode CR25. Since the sawtooth output from cathode follower V3-B must exceed this set level before an output from the diode comparator CR3 and CR25 is obtained, an amplified output will appear on lead $b$ only after a time delay determined by the sawtooth rise time necessary to reach the set level as reckoned from the instant of the radar transmitted pulse. Thus, a delayed sawtooth is obtained on lead $b$. The motor B-2 is also mechanically coupled to vary resistors R33 and R34, and capacitor C19 of a network which produces a hyperbolic sweep output from the sweep generator next described. The tap of potentiometer R15, resistors R33, R34 and capacitor C19 are all ganged together to be directly driven by motor B-2.

The sweep generator which produces a hyperbolic sweep output signal is shown in FIGURE 3$b$. The leads from FIGURE 3$a$ are labeled identically in FIGURE 3$b$ and are merely continuations of those leads. The rising signal appearing on lead $b$ is applied to the control grid of triode V5-A. The signal on lead $b$ is thus amplified and inverted by V5-A to trigger the extended period one shot multivibrator including triodes V6-A and V6-B. The anode of triode V6-A is coupled to the control grid of triode V7 through capacitor C14. The plate output of V6-A appears on lead $h$ and is also applied to the left triode section of tube V38 of the start-stop circuit through coupling capacitor C82. The triode V7 is connected in a hyperbolic sweep generator through lead $d$ which is connected to the altitude variable network shown in FIGURE 3$a$. An exponential waveform appears across each of the two sections including a variable resistor in parallel with a capacitor, and a linear sawtooth is provided across the variable capacitor C19 in parallel with a fixed capacitor C18. The summed output across all three sections very closely approximates a true hyperbolic waveform. The hyperbolic waveform output is applied to the control grid of cathode follower V3-A and output signals are obtained on leads $e$ and $g$. The hyperbolic waveform output is generally reduced in slope (and lengthened) by motor B-2 for increasing altitudes.

The anode of tridoe V6-B is connected to the control grid of the right triode section of tube V38 through a capacitor C83. Normally, the left and right triode sections of tube V38 conduct substantially equally. When the anode potential of triode V6-A drops suddenly when triggered, the anode potential of triode V6-B correspondingly rises, such that a positive pulse is applied differentiated to the right triode section of tube V38. The positive pulse due to the leading edge of the anode potential rise of V6-B produces a positive output pulse at receptacle P9 through coupling capacitor C84. The simultaneous negative pulse due to the leading edge of the anode potential drop of V6-A applied to the left triode section of tube V38 momentarily cuts off the left triode section but this effect is greatly outbalanced by the current increase produced by the joint positive pulse. A similar action occurs for the trailing edge of the anode potential drop of triode V6-A, applied differentiated as a positive pulse to the right triode section of tube V38, so that a positive output pulse is obtained at receptacle P9 when the one shot multivibrator V6 is returned to its original state. The two positive output pulses respectively indicate the start and stop instants of the sweep signal applied to the cathode ray tubes.

The stop output pulse is caused by a signal appearing on lead $i$ when the signal rises above a level set by resistor R68 in the Sweep Off circuit. This occurs when the hyperbolic waveform sweep signal on lead $e$ reaches a predetermined level. The resultant input signal is amplified by tubes V14-A and V14-B and is applied to the control grid of tube V5-B. The consequent drop in plate voltage of V5-B triggers the one-shot multivibrator V6-A and V6-B back into its initial or original state wherein tube V6-B normally conducts. The rise in plate voltage of V6-A is, of course, applied differentiated to the left triode section of tube V38 for the output pulse at receptacle P9 indicating the end of the sweep signal when the hyperbolic sweep signal drops steeply. When the sweep is set for a 15 mile range, the switch K1a is closed energizing the range delay K1 putting resistor R35 in parallel with resistor R32 such that the charging step current is increased, and the hyperbolic signal on lead e rises more steeply, producing a signal on lead i reaching the present level which produces the stop pulse in approximately half the time than that necessary for a 30 mile range.

The reconnaissance information is provided in the form of video signals which are alternately derived from left then right radar antennas, and back, by conventional coaxial antenna switching at a 50 c.p.s. rate, for example. At the same time, a synchronizing signal which, for example, can be a 50 c.p.s. square wave, is also produced and provided to receptacle P4 in FIGURE 3c. The square wave is differentiated by capacitor C48 and resistor R113 and amplified by triode V42. The output is applied to amplifier V21–A and also two stage amplifier V23 and V21–B, to control a multivibrator including tubes V22–A and V22–B. A rise in the square wave will render V22–B conducting and V22–A non-conducting whereas a drop will reverse this condition so that V22–A is conducting and V22–B non-conducting. The 50 c.p.s. gate is a conventional flip-flop circuit wherein gate outputs are obtained respectively from the anodes of V22–A and V22–B, appearing on leads v and u. Indicator I-1 can be a small neon glow lamp.

Figure 3C:
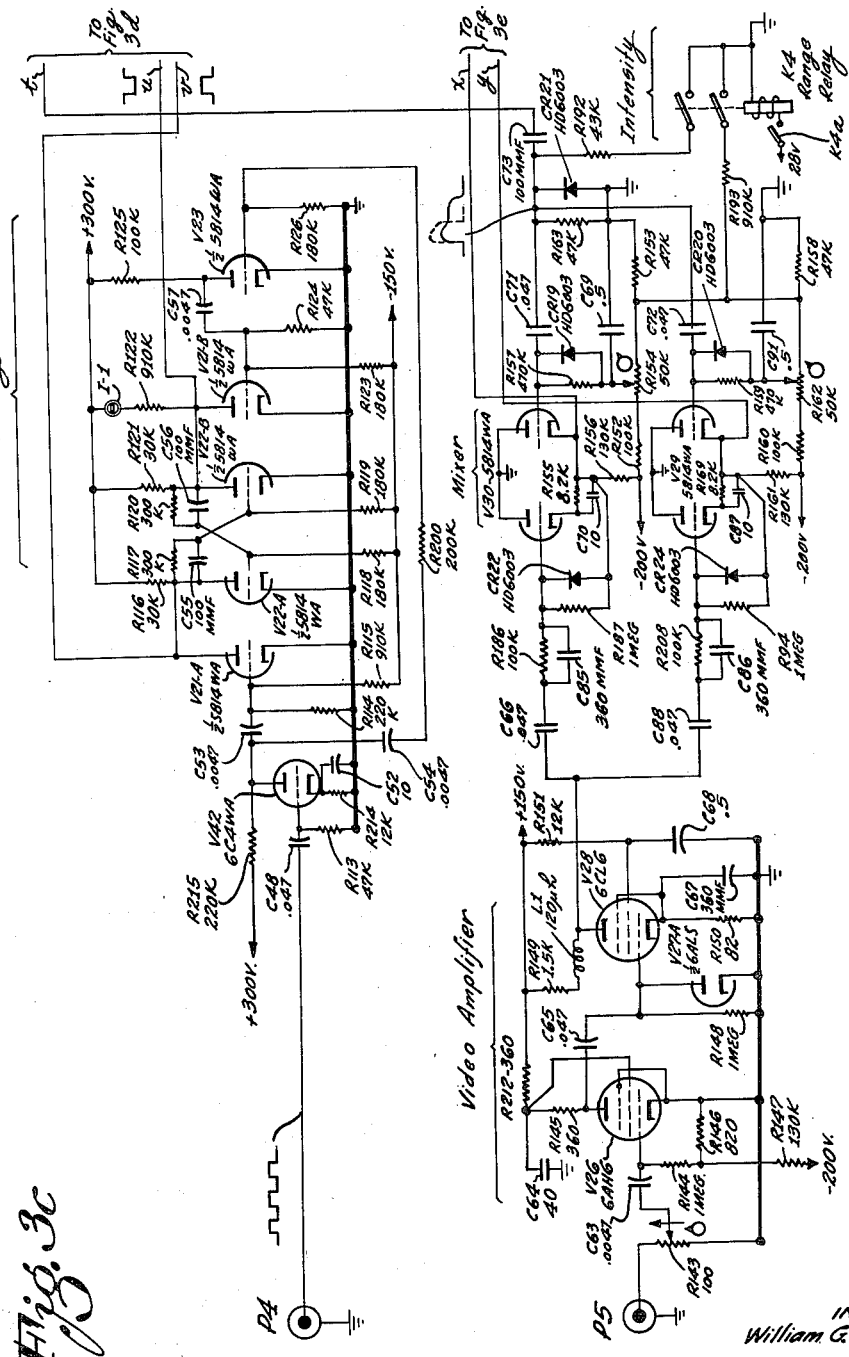
Figure 3D:
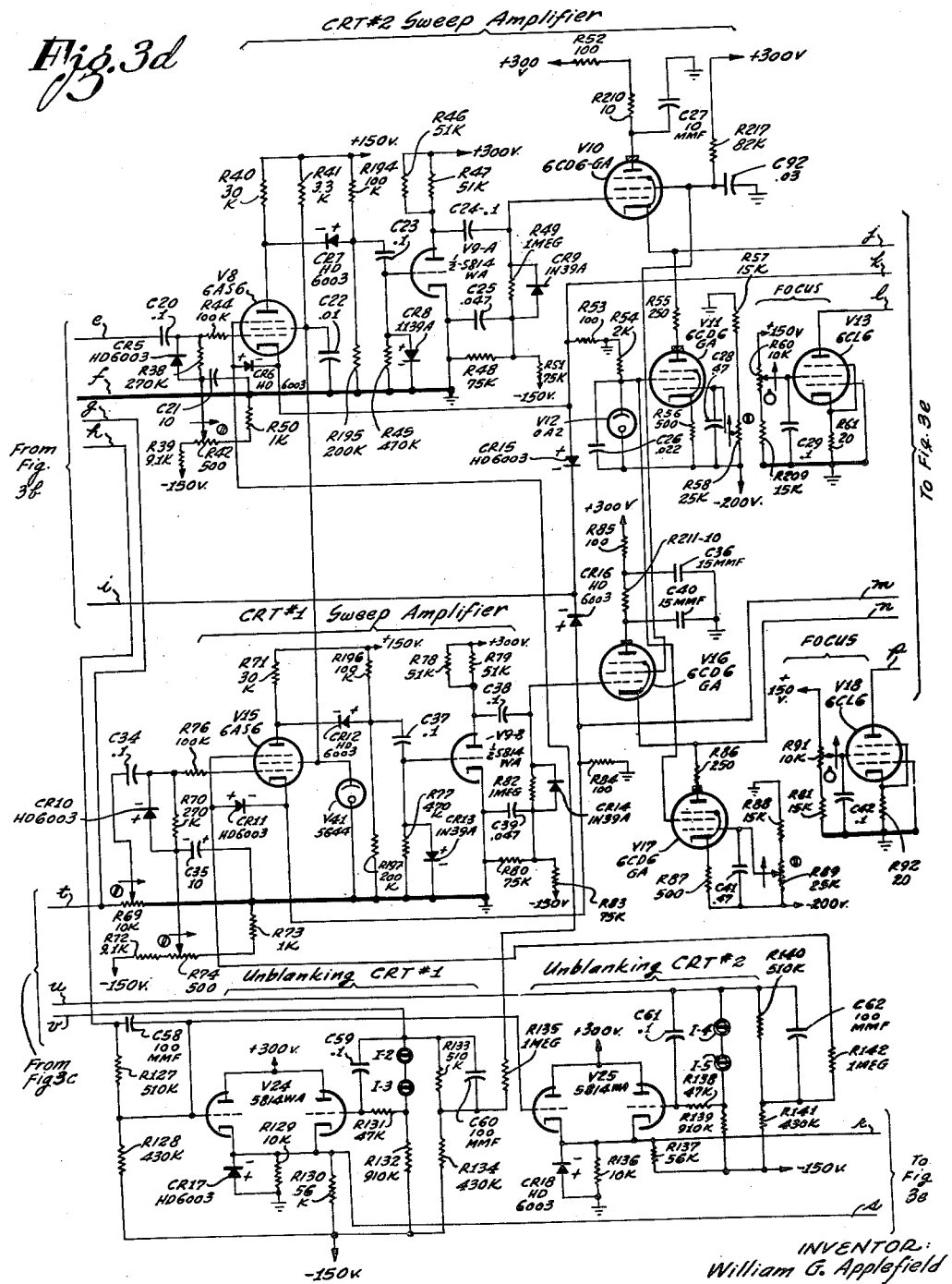

The time duplexed antenna video signals are provided at receptacle P5, and further amplified by a video amplifier including tubes V26 and V28. A negative clamping diode V27–A is connected between the control grid of V28 and ground. The output of the video amplifier is directed to two channels of a mixer including dual triodes V29 and V30. The video signals are applied to the control grids of the left triode sections through respective decoupling input networks including resistors R186 and R208. High frequency bypass capacitors C85 and C86 respectively shunt these resistors. Negative clamping diodes CR22 and CR24 are again employed. The video signals are mixed with a compensating signal which appears on lead t and is applied to the mixer through an intensity compensating circuit. The signal which appears on lead t is the hyperbolic waveform that appears on lead g (FIGURE 3b) since lead t is connected directly to lead g as can be seen in FIGURE 3d. The hyperbolic waveform signal on lead t is differentiated mainly by capacitor C73 and resistor R163. Diode CR2 is a negative clamp connected as shown in FIGURE 3c.

The differentiated signal is split and applied to both of the control grids of the right triode sections of the dual triodes V29 and V30 through suitable respective input networks. A negative bias resistor divider such as resistors R152, R154 and R153 provides a negative grid bias through resistor R157. A similar network is provided for the dual triode V29. Mixed outputs are obtained on leads x and y which are respectively connected to the cathodes of the right triode sections of V30 and V29. The mixed output signals are compensated for beam sweep velocity variation due to the varying slope hyperbolic waveform sweep signal which is quite steep initially but then levels out to a lower slope. The cathode ray tube beam is thus deflected very fast at the beginning of a sweep and then gradually moves much slower. The result is that an intensity modulated beam is not reproduced faithfully because the reproduced line intensity of a constant intensity beam is variable with beam sweep velocity. A signal produced from differentiating the hyperbolic sweep signal, of course, would provide a correct compensating signal when added to the video signals. This is accordingly accomplished by the mixer circuit just described.

There is another effect which must be taken into consideration when the equipment is operated over two different scan ranges (of 15 miles and 30 miles, for example). The cathode ray tube light output (intensity) is a function of control grid voltage or bias voltage and sweep speed. The sweep period for the 15 mile range is approximately half that for the 30 mile range but the cathode ray tube beam is deflected the same amount (distance) across the face of the cathode ray tube in both instances. This means that the beam sweep velocity (hyperbolic slope) varies within two respectively different sweep speed ranges or bands, the beam velocity for the 15 mile range varying over sweep speed limits which are generally above those defining the electron beam sweep speeds for the 30 mile range. Since cathode ray tube light output (intensity) is variable with electron beam sweep velocity and also variable with bias voltage, it follows that electron beam sweep velocity can be related to bias voltage. A family of generally parallel curves can be obtained by plotting sweep speed against bias voltage for different constant cathode ray tube light output intensities. The highest cathode ray tube resolution is obtained at the lowest light intensities, and the curves for these intensities are more equally spaced for equal intensity differences and can be each approximated by two straight lines of different slope over the two sweep speed ranges for the radar scan ranges of 15 and 30 miles. The bias voltages corresponding to the operating reference levels of the two straight lines approximating the lowest median (i.e., the selected minimum operational output without any video signals applied) constant intensity curve illustrated in FIGURE 4 are respectively applied to each cathode ray tube control grid when the radar set is operating in the particular scan ranges. Thus, the cathode ray tube light output becomes substantially linearly variable with bias voltage over either operating scan range and its related beam sweep velocities, and electron beam modulation intensity at any particular sweep speed is dependent only on control grid voltage.

Bias adjustment is accomplished by energizing range relay K4 by closing switch K4a which can be mechanically ganged with switch K1a. When range relay K4 is energized for 15 mile range operation, resistor R193 is inserted in the bias circuit in parallel with resistors R153 and R158. The effect is that mixer grid bias is made less negative and the cathode ray tube grid bias on leads x and y also becomes less negative as a result of increased tube current flow through the right triode sections of the mixer. This adjusts the bias voltage for the cathode ray tubes to a proper value which maintains undiminished cathode ray tube light output intensity for the higher sweep velocities encountered. Another resistor R192 is also inserted in the intensity compensation circuit on energization of range relay K4. This resistor R192 is connected in parallel with differentiating resistor R163, reducing the resistance which shortens the R-C time constant. A more strongly differentiated output is provided to the two mixer channels but generally decreases the gain of the circuit. This, however, provides more precise intensity compensation for the higher sweep speeds. Output leads x and y are connected to the control grids of the right and left cathode ray tubes V39 and V40, respectively.

The sweep generator hyperbolic output signal on leads e and g (FIGURE 3b) are respectively fed to sweep amplifiers shown in FIGURE 3d. The hyperbolic output signal applied to tube V8 is amplified and then further amplified by tube V9–A. Clipper diode CR7 eliminates any trailing edge overshoot of the hyperbolic sawtooth. The sawtooth output from V9–A is converted into current form by V10 and appears on lead j. Positioning control of beam sweep length is available through V11 which is connected to lead j and can be adjusted to regulate the amount of current directed to the deflection coil of the right cathode ray tube which is connected to lead j as can be seen in FIGURE 3e. The return lead k is returned to ground through resistor R53 (FIGURE 3d) which is also the cathode resistor of tube V8. The voltage developed across resistor R53 is passed through diode CR15 to lead $i$ which is connected to the Sweep Off circuit shown in FIGURE 3b. The sweep stop signal is obtained when the developed voltage exceeds that set on potentiometer R68 as was previously described. The diode CR6 in FIGURE 3d clamps the cathode with the third (suppressor) control grid of tube V8 and also prevents application of the developed voltage across resistor R53 to the third (suppressor) control grid of V8. The rising potential on the cathode of V8 increases cutoff effectiveness at the proper instant.

The hyperbolic sweep signal appearing on lead $g$ is impressed across potentiometer R69 and the signal therefrom is applied to a similar sweep amplifier as described just before, including tubes V15, V9-B and V16, to provide a current sawtooth on lead $n$ which is connected to the left cathode ray tube deflection coil as can be seen in FIGURE 3e. The return lead $m$ is returned to ground through resistor R84 (FIGURE 3d) which is also the cathode resistor of tube V15. The voltage developed across resistor R84 is passed through diode CR16 to lead $i$ as in the previous case. Positioning control of beam sweep length is adjusted by amplifier V17 which is similar to V11.

The diodes CR15 and CR16 do not conduct at the same time, of course, since the two sweep amplifiers do not have outputs simultaneously. The switching gate signals appearing on leads $u$ and $v$ (FIGURE 3c) are applied to respective unblanking circuits shown in FIGURE 3d. The two unblanking circuits are similar, and a description of one is equally applicable to the other. Lead $u$ is directly coupled through series connected neon lamps 14 and 15 to the control grid of the right triode section of dual triode V25. Similarly, lead $v$ is directly coupled through series connected neon lamps 12 and 13 to the control grid of the right triode section of dual triode V24. Both of the control grids of the left triode sections are connected to lead $h$ through coupling capacitor C58. When the sweep generator (FIGURE 3b) is triggered, a drop in potential is obtained on lead $h$ and is applied to the control grids of the left triodes of both dual triodes V24 and V25. At the same time, the switching gate is also triggered and a drop in potential is obtained on lead $u$ while a rise in potential is obtained on lead $v$. These two potential changes are applied to the control grid of the right triode sections of dual triodes V25 and V24, respectively. The rise in potential on lead $v$ will maintain conduction in tube V24 such that lead $s$ connected to the cathode of V24 remains at a positive potential and blanks the left cathode ray tube CRT #1. The drop in potential on lead $u$, however, together with the drop in potential on lead $h$ applied to both control grids of the left triode sections of V24 and V25, cuts off conduction in tube V25, such that lead $r$ connected to the cathode of V25 drops to a negative potential because of the negative bias provided through resistor R137 and diode CR18 unblanking the right cathode ray tube CRT #2. Leads $r$ and $s$ are respectively connected to the cathodes of the right and left cathode ray tubes, as shown in FIGURE 3e. Thus, the right cathode ray tube CRT #2 is unblanked while the left cathode ray tube CRT #1 remains blanked.

The drop in potential on lead $u$ (FIGURE 3d) is also applied to series resistors R140 and R141, the latter resistor being connected to −150 volts. Resistor R142 connects the common junction of resistors R140 and R141 to the third (suppressor) control grid of V15. Similarly, the rise in potential on lead $v$ is applied to series resistors R133 and R134, the latter resistor being connected to −150 volts. Resistor R135 connects the common junction of resistors R133 and R134 to the third (suppressor) control grid of V8. The resulting positive and negative potentials applied directly to the third (suppressor) control grids of V8 and V15, respectively, permits V8 to operate but prevents V15 from conducting. Thus, the compensated video signal on lead $x$ (FIGURE 3e) and corresponding with the reconnaissance information being detected by the right radar antenna will intensity modulate the unblanked right cathode ray tube CRT #2 in which the electron beam is deflected under a hyperbolic waveform drive signal.

The gate signals on leads $u$ and $v$ are reversed in polarity at the radar antenna switching rate. For a switching rate of 50 c.p.s., each intensity modulated cathode ray tube is energized alternately for 1/100 second. If the timed sweep trigger pulses, also supplied by the radar set, are provided at 1200 c.p.s. to trigger the sweep generator, lead $h$ accordingly changes in potential at this rate, and 12 sweeps are made on each cathode ray tube before the other is again energized. Focus control of the electron beam is effected by tubes V13 and V18 (FIGURE 3d) which are connected to provide adjustment of the current flowing respectively in the focus coils of the right and left cathode ray tubes. A conventional high voltage source PS-1 (FIGURE 3e) supplies high voltages and other usual necessary voltages for the two cathode ray tubes.

A novel and useful sweep circuit providing an altitude sensitive hyperbolic sweep signal which is extremely accurate over the entire sweep range and variably delayed according to altitude, and including intensity compensation for widely varying sweep velocities as well as cathode ray tube bias voltage effects on intensity, has been described in detail. The illustrative sweep circuit described operates well and is satisfactory in all ways from altitudes of 4000 to 60,000 feet. It is to be understood, however, that the particular embodiment of my invention described above and shown in the attached drawings is merely illustrative of and not restrictive of the broad invention, and that various changes in design, structure and arrangement may be made without departing from the spirit and scope of the broader of the appended claims.

I claim:

1. A sweep circuit, comprising: a sweep generator for providing a hyperbolic output signal; a cathode ray tube having a control grid and electron beam deflection means; means for applying the hyperbolic output signal to the deflection means of said cathode ray tube; a source of video signals; means for differentiating the hyperbolic output signal for a compensation signal; means for adding the compensation signal to the video signals; means for applying the compensated video signals to the control grid for modulating the electron beam of said cathode ray tube; and means for synchronizing application of the hyperbolic output signal to the deflection means of said cathode ray tube with application of the compensated video signals, to the control grid of said cathode ray tube whereby the electron beam is modulated to provide a cathode ray tube output which is compensated for a deflection sweep of the electron beam produced by the hyperbolic output signal.

2. The invention according to claim 1 wherein said adding means includes a dual triode mixer having respective triode inputs and a single combined output, the compensation signal and the video signals being applied to respective triode inputs and the compensated video signals being obtained from the single combined output.

3. A sweep circuit, comprising: a sweep generator for providing a hyperbolic output signal having a variable sweep period; means for adjusting said sweep generator to vary the sweep period of the hyperbolic output signal; a cathode ray tube having a control grid and electron beam deflection means; means for applying the hyperbolic output signal to the deflection means of said cathode ray tube; a source of video signals; means for differentiating the hyperbolic output signal for a compensation signal; a source of bias voltage; means for adding the bias voltage and compensation signal to the video signals; means for applying the biased, compensated video signals to the control grid for modulating the electron beam of said cathode ray tube; means responsive to said adjusting means of said sweep generator for varying the bias voltage according to the sweep period of the hyperbolic output signal; and means for synchronizing application of the hyperbolic output signal to the deflection means of said cathode ray tube with application of the biased, compensated video signals to the control grid of said cathode ray tube, whereby the electron beam is modulated to provide a cathode ray tube output which is compensated for a variable period deflection sweep of the electron beam produced by the hyperbolic output signal.

4. The invention according to claim 3 wherein said adding means includes first and second triodes each having an anode, control grid and cathode, the compensation signal and the video signals being respectively applied to the triode control grids, a resistor connected on one end to the cathodes, said source of bias voltage connecting the other end of said resistor to the anodes, and output connections respectively to the cathodes and the anodes for providing the biased, compensated video signals.

5. A sweep circuit, comprising: a sweep generator for providing a hyperbolic output signal, said sweep generator including a source of square wave pulses, an electron tube having a control grid, anode and cathode, said source adapted to be connected to the control grid and cathode of said electron tube, said electron tube being normally non-conductive and responsively conductive on application of a square wave pulse thereto, an R-C circuit including a resistance connected in series with a resistance-capacitance network, said R-C circuit being connected across a voltage supply and the anode and cathode of said electron tube connected to respective ends of the resistance-capacitance network, and output means connecting with the resistance-capacitance network, whereby the resistance-capacitance network is charged through the series resistance when said electron tube is non-conducting and discharged through said electron tube when conductive, a hyperbolic output signal being obtained through said output means; means for delaying the hyperbolic output signal; a cathode ray tube having a control grid and electron beam deflection means; means for applying the delayed hyperbolic output signal to the deflection means of said cathode ray tube; a source of video signals; means for differentiating the delayed hyperbolic output signal for a compensation signal; means for adding the compensation signal to the video signals; means for applying the compensated video signals to the control grid for modulating the electron beam of said cathode ray tube; and means for synchronizing application of the delayed hyperbolic output signal to the deflection means of said cathode ray tube with application of the compensated video signals to the control grid of said cathode ray tube, whereby the electron beam is modulated to provide a cathode ray tube output which is compensated for a deflection sweep of the electron beam produced by the hyperbolic output signal.

6. The invention according to claim 5 wherein said delay means includes a control potentiometer having an adjustable tap and connected to regulate the delay produced by said delay means, said resistance-capacitance network comprises a first variable resistance connected in parallel with a first capacitance, a second variable resistance connected in parallel with a second capacitance, and a third variable capacitance connected in parallel with a fourth capacitance, said three parallel combinations being connected in series, and including, in addition, an altitude servo comprising a synchro having an input adapted to be responsively connected to an altimeter, and having a mechanical output connected to directly drive the adjustable tap of said potentiometer, said first variable resistance, said second variable resistance and said third variable capacitance.

References Cited in the file of this patent
UNITED STATES PATENTS
2,611,126    Irving _____ Sept. 16, 1952